US007321988B2

(12) United States Patent
Guo et al.

(10) Patent No.: US 7,321,988 B2
(45) Date of Patent: Jan. 22, 2008

(54) IDENTIFYING A CODE LIBRARY FROM THE SUBSET OF BASE POINTERS THAT CAUSED A FAILURE GENERATING INSTRUCTION TO BE EXECUTED

(75) Inventors: Quji Guo, Stanford, CA (US); Roberto A Franco, Seattle, WA (US); Edward J Praitis, Woodinville, WA (US); Li-Hsin Huang, Bellevue, WA (US); Jingyang Xu, Redmond, WA (US); Brian D Wentz, Seattle, WA (US); Julian Jiggins, Seattle, WA (US); Venkatavaradhan Panchapagesan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 667 days.

(21) Appl. No.: 10/880,819

(22) Filed: Jun. 30, 2004

(65) Prior Publication Data

US 2006/0005078 A1 Jan. 5, 2006

(51) Int. Cl.
*G06F 11/00* (2006.01)
(52) U.S. Cl. ........................................ 714/38; 717/124
(58) Field of Classification Search .................. 714/38; 717/124
See application file for complete search history.

(56) References Cited

U.S. PATENT DOCUMENTS

| 6,718,485 B1* | 4/2004 | Reiser ......................... 714/38 |
| 7,159,147 B2* | 1/2007 | Hasha ......................... 714/38 |
| 2002/0087949 A1* | 7/2002 | Golender et al. ........... 717/124 |
| 2004/0015736 A1* | 1/2004 | Mihara ........................ 714/20 |
| 2004/0068677 A1* | 4/2004 | Briskey et al. ............... 714/38 |
| 2004/0078784 A1* | 4/2004 | Bates et al. .................. 717/129 |
| 2005/0081190 A1* | 4/2005 | Betancourt et al. ......... 717/124 |

OTHER PUBLICATIONS

Arlat, J., et al., "Dependability of COTS Microkernel-Based Systems," *IEEE Transactions on Computers* 51(2):138-163, Feb. 2002.
Damm, A., "The Effectiveness of Software Error-Detection Mechanisms in Real-Time Operating Systems," *Proc. 16th Int. Symp. on Fault-Tolerant Computing (FTCS-16)*, IEEE Computer Society, Vienna, Austria, Jul. 1986, pp. 171-176.
Hollis, R., and B.S. Brunelle, "Developing a Common User Interface for Information Searching," *The Electronic Library* 13(4):283-286, Aug. 1995.
Oh, N., et al., "Control Flow Checking by Software Signatures," *IEEE Transactions on Reliability* 51(1):111-122, Mar. 2002.
Smith, R.E., "Cost Profile of a Highly Assured, Secure Operating System," *AMC Transactions on Information and Systems Security* 4(1):72-101, Feb. 2001.

* cited by examiner

*Primary Examiner*—Gabriel Chu
(74) *Attorney, Agent, or Firm*—Christensen O'Connor Johnson Kindness PLLC

(57) ABSTRACT

The present invention is generally directed to improving the stability of computing devices by identifying plug-in modules and other programs that cause failures. More specifically, the present invention provides a method that traces program execution from an instruction that ultimately generated a failure to a code library that caused the failure generating instruction to be executed. The method traces execution of the computing device by obtaining the contents of memory at the time of the failure and traversing the stack data structure that stores data items necessary to execute function calls.

32 Claims, 7 Drawing Sheets

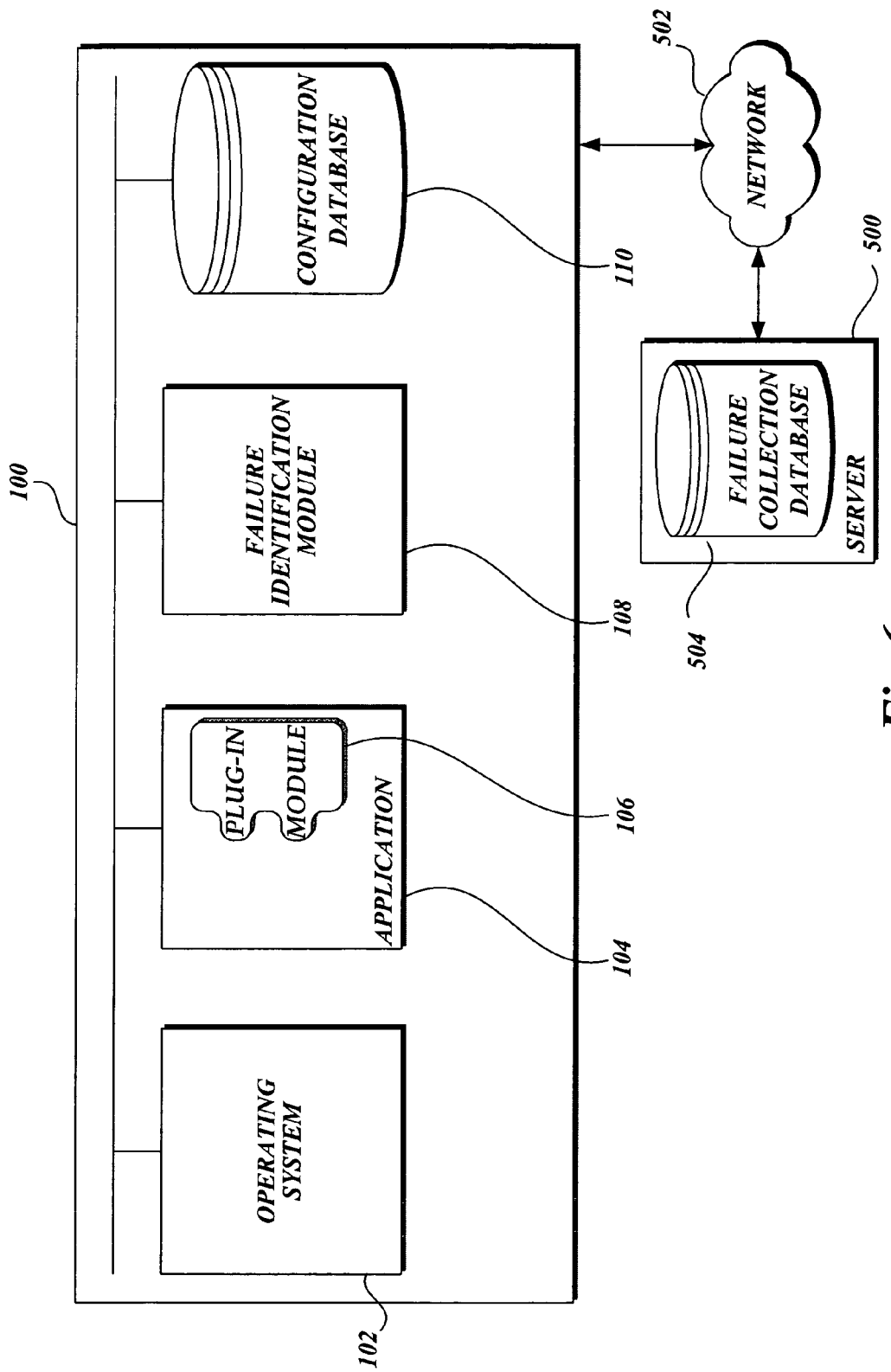

IDENTIFYING A CODE LIBRARY FROM THE SUBSET OF BASE POINTERS THAT CAUSED A FAILURE GENERATING INSTRUCTION TO BE EXECUTED

FIELD OF THE INVENTION

The present invention relates to computer programs and, in particular, to identifying computer programs that cause failures.

BACKGROUND OF THE INVENTION

Computer programs such as word processors, spreadsheets, databases, and Web browsers, among others, were originally developed as standalone systems. Third parties (i.e., people or organizations other than the original program developers) were not able to add functionality to programs created by others. However, programs are becoming more complex and developers do not have the resources to provide all of the functionality that users may want or need. Thus, some modern programs allow third parties to add functionality (in the form of another program called a plug-in module) to a host program. For example, in the word processing context, Microsoft Word® supports plug-in modules developed by third parties that allow users to view files that could not be displayed without the plug-in module.

In general, plug-in modules are software extensions that add functionality to a program. Typically, a plug-in module will be installed into a specific directory location that is searched when the host program begins execution. If the plug-in module is properly located, the host program will interact with the plug-in module to extend or enhance the program's abilities.

Plug-in modules may extend a host program's features in any number of different ways. More specifically, in the context of Web browsers, plug-in technology enables plug-in modules, such as ActiveX® controls, browser helper objects, and toolbar extensions, to execute within a Web browser and to act as part of the Web browser. A Web browser's functionality can thus be arbitrarily extended. For example, with the assistance of plug-in modules, a Web browser can access and execute files embedded in a Web page that are in formats the browser would not normally recognize, such as flash animation, video, and audio files. Unfortunately, plug-in modules, if designed incorrectly, may cause a program such as a Web browser to "crash" or fail. As known to those skilled in the art and others, failures are frustrating to users and may result in the loss of information. Typically, a failure occurs when a program performs an operation that is not permitted by an operating system.

A substantial portion, if not almost all, of the failures in programs that support plug-in technology are caused by plug-in modules. To the user, the cause of the failure is unknown. Some users mistakenly believe that the failure is caused by an error in the host program that supports the plug-in technology. As a result, some users continue to use plug-in modules created by third parties, resulting in continued instability. Obviously, the usability of a program is reduced when the user does not know the cause of a failure and is unable to prevent future failures. Existing programs do not identify to users the cause of a failure or assist users in preventing future failures. Instead, program providers receive reports from users who experience failures and from these reports identify the cause of the failure. If a plug-in module caused the failure, the program provider may either provide an update that disables the plug-in module or request an update from the third party that created the plug-in module.

As mentioned above, the current failure prevention paradigm is a reactionary system, i.e., a program is updated to prevent failures only after failures are reported. Furthermore, the computer program update cycle is an extremely costly process for the program provider and, ultimately, for consumers.

In light of the above-identified problems, it would be beneficial to computer users, both in terms of convenience and in terms of cost-effectiveness, to have a system that identifies plug-in modules and other programs that cause failures. The present invention is directed to providing such a system.

SUMMARY OF THE INVENTION

The present invention is generally directed to improving the stability of computing devices by identifying plug-in modules and other programs that cause failures. Modern computing devices support concurrent execution of multiple programs (i.e., multithreading). Also, an increasing number of programs support plug-in technology that allows developers to extend a program's features with plug-in modules (sometimes referred to as "add-ons" or "add-on modules"). These features, namely concurrent execution of multiple programs and plug-in technology, are factors that make identifying the source of a failure problematic. After a failure occurs, the information available to analyze and prevent future failures is the memory content of a computing device that existed at the time of the failure. However, the memory content may include data from multiple programs and associated plug-in modules. The present invention is directed to identifying the source (i.e., program or plug-in module) of a failure by analyzing memory content that existed at the time of the failure.

One aspect of the present invention is a method that identifies a code library that was the most likely source of the failure. More specifically, the method analyzes a stack data structure of the active thread identifying base pointers in the stack. Then the method selects a subset of base pointers based on the relationships that exist between the base pointers. Code libraries, known as dynamically linked libraries ("DLLs"), that are associated with the subset of base pointers are then analyzed. In one embodiment, DLLs are compared to a database that contains DLLs known to cause failures. In another embodiment, each DLL is assigned a value based on certain properties that are characteristic of failure generating DLLs. In any event, the method analyzes each DLL associated with the subset of base pointers to determine which DLL is the most likely source of the failure.

Another aspect of the present invention is a system that includes a computing device, an operating system, an application with an associated plug-in module, a failure identification module, and a configuration database. The system is configured to recognize the occurrence of a failure and analyze the memory content of the computing device. The analysis includes tracing program execution from an instruction that ultimately generated the failure to a DLL that caused the failure generating instruction to be executed. The system is further configured to identify the program or plug-in module that implements the DLL that caused the failure generating instruction to be executed.

In yet another aspect, a computer-readable medium may be provided with contents that cause a computing system to operate in accordance with the methods described herein.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 6 is a block diagram of a network, including two computing devices that are communicatively connected and suitable to illustrate embodiments of the present invention.

DETAILED DESCRIPTION OF THE PREFERRED EMBODIMENT

The present invention is generally directed to improving the stability of computing devices by identifying plug-in modules or other programs that cause failures. More specifically, the present invention provides a method that traces execution of a computing device from a computer instruction that ultimately generated a failure to a DLL that caused the failure generating instruction to be executed. The method traces execution of the computing device by obtaining the contents of memory at the time of the failure and traversing a stack data structure associated with the active thread.

Although the present invention will be described in the context of identifying programs that cause failures, those skilled in the relevant art and others will appreciate that the present invention is also applicable in other areas of software engineering and testing. The following description first provides an overview of a system in which the present invention may be implemented. Then a method that analyzes data in memory at the time of the failure and identifies a DLL that is the most likely source of the failure is described. The illustrative examples provided herein are not intended to be exhaustive or to limit the invention to the precise forms disclosed. Similarly, any steps described herein may be interchangeable with other steps, or combinations of steps, in order to achieve the same result.

Figure 1:
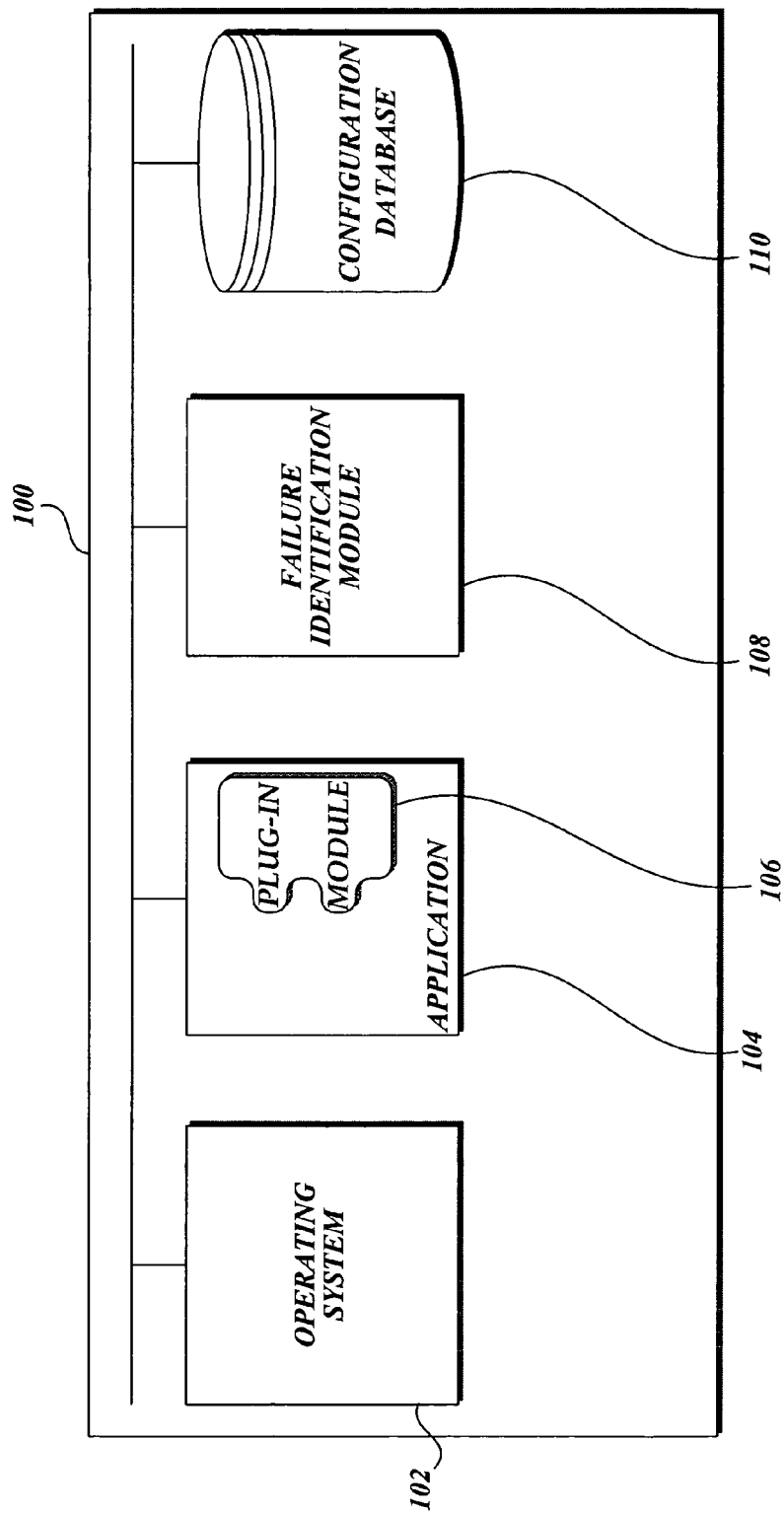
FIG. 1 is a block diagram of a computing device that is suitable to implement embodiments of the present invention.

To provide a context for describing embodiments of the present invention, FIG. 1 illustrates a functional block diagram of a computing device 100 that may be used to implement embodiments of the present invention. The computing device 100 includes an operating system 102 in communication with a variety of components, including an application 104 with an associated plug-in module 106, a failure identification module 108, and a configuration database 110. The computing device 100 is suitable to execute programs, such as application 104. Also, the computing device 100 may be any one of a number of computing devices including, but not limited to, personal computing devices, hand-held computing devices, server-based computing devices, personal digital assistants, mobile telephones, stand-alone memory devices, electronic devices having some type of memory, and the like. For ease of illustration and because they are not important to an understanding of the present invention, FIG. 1 does not show the typical components of computing device 100, such as a keyboard, mouse, printer, or other input/output devices, central processing unit, display, etc. Also, FIG. 1 does not show other computing devices that may be connected to computing device 100.

As illustrated in FIG. 1, the computing device 100 stores an operating system 102 for controlling the general operation of the computing device 100 and providing services and resources requested by programs. The operating system 102 may be a general-purpose operating system that is commercially available such as a Microsoft® operating system, UNIX® operating system, or Linux® operating system. As known to those skilled in the art and others, a general purpose operating systems performs basic tasks, such as managing the I/O (input and output) of a computing device and tracking data stored in memory. With regard to the present invention, the operating system 102 stores the contents of memory when a failure occurs so that the failure identification module 108, described in detail below, may identify the most likely source of a failure.

As noted above, the computing device 100 stores an application 104 and an associated plug-in module 106. The application 104 may be any computer program capable of generating instructions for the computing device 100 to execute. The plug-in module 106 communicates and exchanges information with the application 104 in order to cooperatively carry out the added functionality provided by the plug-in module 106. Additionally, the plug-in module 106 may have functionality to provide apart from the cooperative processing provided with the application 104.

The computing device 100 also stores a failure identification module 108 for identifying plug-in modules and other programs that cause failures. As a brief summary, the failure identification module 108 is a set of software-implemented routines that identifies the DLL that is the most likely source of the failure. After a failure occurs, the memory contents of the computing device 100 are stored by the operating system 102 and transmitted from the operating system 102 to the failure identification module 108. Then the failure identification module 108 performs an analysis on the memory contents, which includes tracing execution of a program. As described in further detail below, program execution is traced by traversing a stack data structure used to implement function calls.

As illustrated in FIG. 1, another component of the computing device 100 is a configuration database 110 that stores settings, options, and preferences for executing programs.

As known to those skilled in the art and others, a system registry is one illustrative example of a configuration database 110. When a computer program, such as application 104 or plug-in module 106, is installed on a computing device, a class identifier, which is used to identify the program, is stored in the configuration database 110. A plug-in module may not function unless certain information including the program's class identifier is contained in the configuration database 110.

In addition to the class identifier, the configuration database 110 also stores references to code libraries, such as DLLs, that a program uses when executing. Typically, executable programs are constructed by combining segments of source code obtained from different locations. The segments may be combined before compiling and then compiled into a program that is executable. Alternatively, when a segment of source code is frequently used, it is often preferable to compile the segment separately and produce a code library, and to combine the code library with other libraries when the functionality of the library is actually needed. DLLs are one example of code libraries. When a program is installed on a computing device, references to DLLs used by the program are stored in the configuration database 110 along with the program's class identifier.

DLLs are code libraries that issue and satisfy function calls between a programming interface. A programming interface (or, more simply, interface) may be viewed as any mechanism, process, or protocol for enabling one or more segment(s) of code to communicate with or access the functionality provided by one or more other segment(s) of code. Alternatively, a programming interface may be viewed as one or more mechanism(s), method(s), function call(s), module(s), object(s), etc., of a component in a system capable of communicating with one or more mechanism(s), method(s), function call(s), module(s), etc., of other component(s). The term "segment of code" is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether the code segments are located on the same or different machines or distributed across multiple machines.

Figure 2:
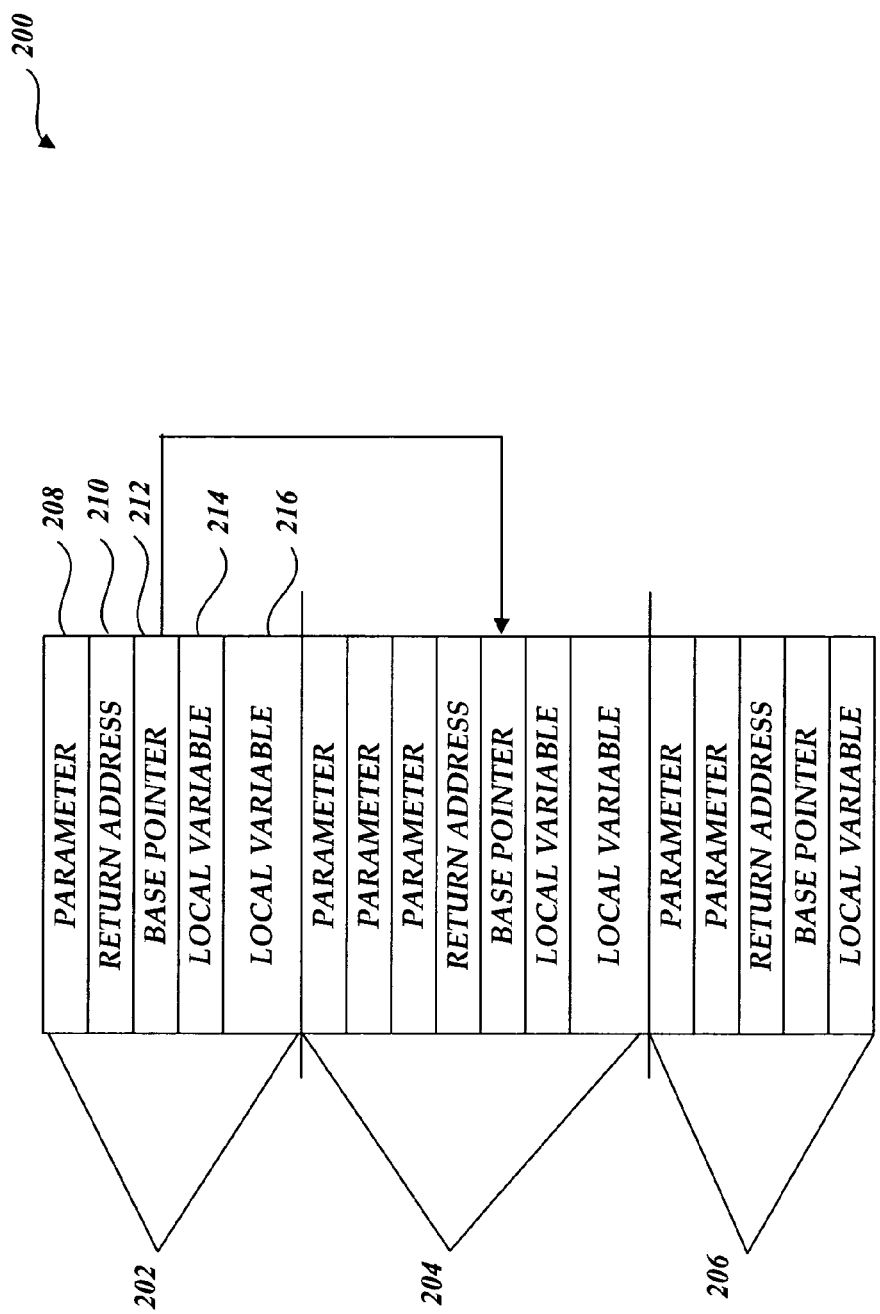
FIG. 2 is a pictorial depiction of a stack data structure that illustrates how data is stored in memory when a function call is made.

With reference now to FIG. 2, the execution of functions (sometimes referred to as subroutines or procedures) and the handling of functions in memory will be illustrated. In modern computing devices, a Central Processing Unit ("CPU") schedules and executes threads. Operating systems that support multithreading appear to simultaneously execute programs at once by maintaining multiple execution contexts (typically at least one for each active program), each comprised of separate program counters and register values. Each execution context is said to correspond to a different thread. Typically, in operating systems that support multithreading with a single CPU, one thread at a time may be active and execute instructions. Such operating systems provide concurrent processing of threads, that is, the illusion of simultaneous processing, by frequently changing the execution context so that each thread, in turn, is the active thread and executes instructions for a brief period. From the point of view of a computing device, a thread is the information needed to service a user or satisfy a request and the execution context is the current state of a thread.

Each thread has an associated stack (sometimes referred to as a "run-time stack") that is used to execute function calls. More specifically, the stack is a data structure that stores local variables, arguments, base pointers, and return addresses. The stack is used by the operating system to store and recall data related to function calls. As a program executes, the stack grows as function calls are encountered and shrinks when function calls complete execution. Stated differently, temporary data related to function calls is "pushed" on the stack when a function call is made and "popped" off the stack when the function call completes execution. The stack is organized into regions called stack frames, each of which is associated with a single function call. FIG. 2 illustrates an exemplary stack 200 with three stack frames 202, 204, and 206. Simply stated, stack frames are comprised of multiple locations in memory that are associated with a particular function call. For example, stack frame 202 consists of five locations in memory including PARAMETER 208, RETURN ADDRESS 210, BASE POINTER 212, LOCAL VARIABLE 214, and LOCAL VARIABLE 216. As described further below, each stack frame contains a base pointer and a return address that are necessary for proper execution of function calls.

A specialized register referred to as a "stack pointer" stores the memory location of the bottom of the stack (i.e., the last data item placed on the stack). In systems where memory addresses are allocated to a stack from a high address value to a low address value (which is conventional), the value of the stack pointer is decremented when a function call is encountered. When a function returns, the stack pointer is incremented to save space on the stack.

Frequently, one function call may initiate additional function calls, all of which are represented on the stack. For example, function calls from an application program are often made to an application programming interface ("API"). After receiving an API function call, the operating system will typically make additional function calls that perform operations necessary to satisfy the original function call. A memory location in each stack frame typically referred to as a base pointer (sometimes referred to as a "frame pointer") contains a value that references a parent stack frame where the function call originated so that the parent stack frame may be restored when the current function exits. As illustrated in FIG. 2, the memory location referenced in the parent stack frame is another base pointer that may reference additional parent stack frames.

When a function completes execution, program flow returns to the statement where the function call originated. Thus a return address is stored in each stack frame when the memory for the stack frame is allocated. The return address references the statement where execution will continue after the called function completes execution. The return address in each stack frame is adjacent to a base pointer and references a location in memory that is not allocated to the stack. Instead, as described in further detail below, the return address references a memory location occupied by a DLL.

It should be well understood that the stack 200 illustrated in FIG. 2 is exemplary as data items may be placed on the stack using different conventions. For example, FIG. 2 illustrates a stack where parameters are placed on the stack at a higher memory address than the base pointer. In other systems, data items may be placed on the stack in a different order relative to the base pointer. Embodiments of the present invention are not limited to one operating system with specific conventions for placing data items on the stack. Thus the contents of the stack illustrated in FIG. 2 should be construed as exemplary and not limiting.

Figure 3:
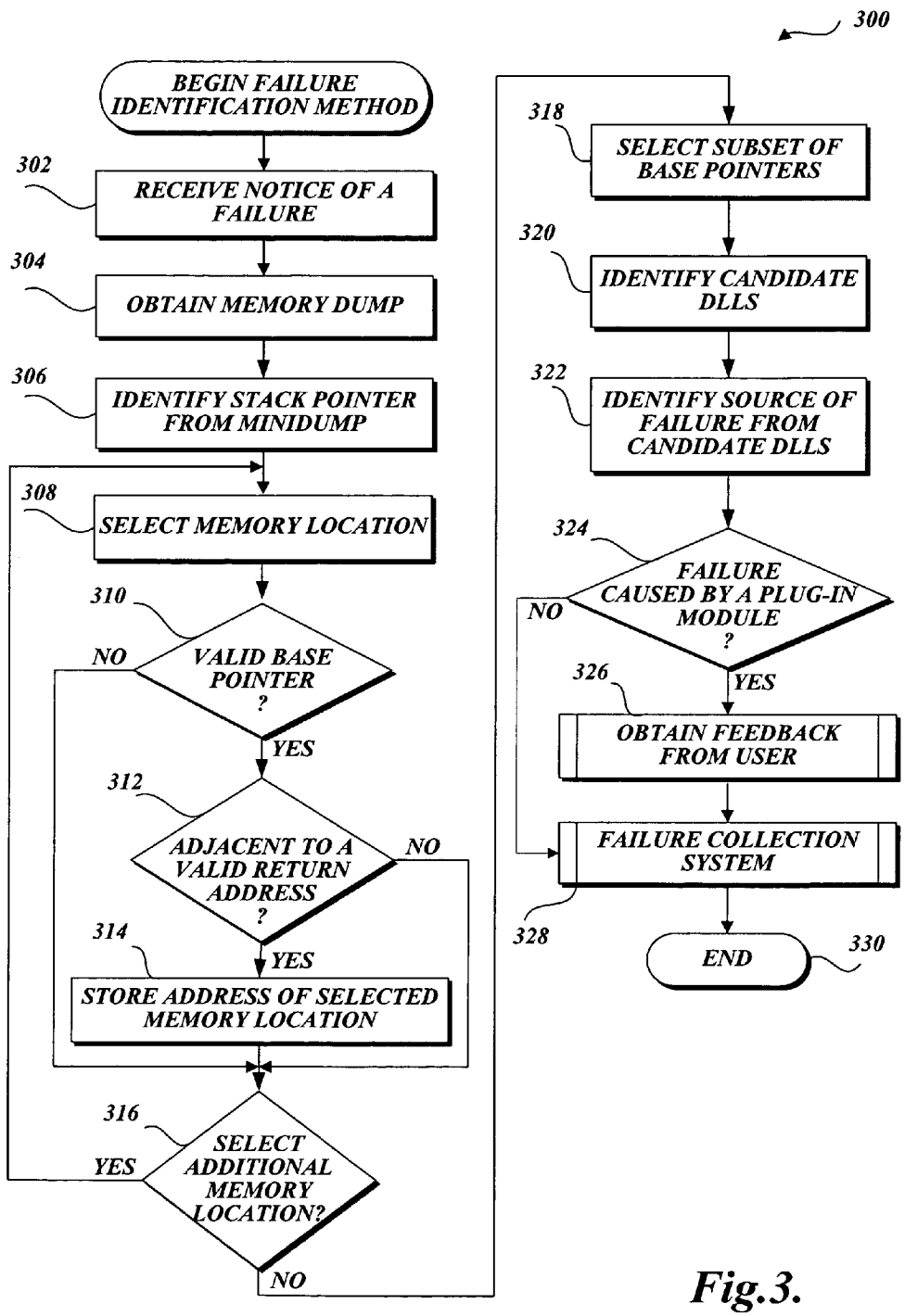
FIG. 3 is a flow diagram illustrating a method that analyzes the memory contents of a computing device after a failure and identifies the source of the failure in accordance with the present invention.

FIG. 3 is a flow diagram illustrating one exemplary embodiment of a failure identification method 300 formed in accordance with the present invention. In summary, the failure identification method 300 receives a notice when a failure occurs. In response to receiving the notice, the method analyzes a "minidump," identifying a DLL that is the most likely source of the failure. The failure identification method 300 differentiates between failures caused by plug-in modules from those caused by other programs. In instances where the failure was caused by a plug-in module, users may have the option of disabling the failure generating plug-in module. With continuing reference to FIGS. 1-2 and the accompanying descriptions, an exemplary failure identification method 300 illustrated in FIG. 3 will now be described.

The failure identification method 300 begins at block 302 where the method 300 receives a notice that a failure occurred. As known to those skilled in the art and others, a notice that a failure occurred may be generated by the use of conventional mechanisms that are available from existing operating systems.

After receiving notice that a failure occurred, the failure identification method 300 proceeds to block 304 where the method obtains a minidump file (hereinafter referred to as a "minidump") that recorded the memory contents of the computing device at the time of the failure. Many operating systems generate a full crash dump or core dump files when the operating system recognizes a failure. Traditionally, when generating a crash dump, the operating system switches to a minimal mode of operation and attempts to save memory contents to a file on disk. A developer may subsequently use the saved information to analyze the failure, for example, off-line, at a later date. Generally, a complete crash dump is a record of all memory present in a computing device saved to a file. A complete crash dump provides developers with access to data structures relating to the state of different components at the time of the crash. The large size of complete crash dumps makes it cumbersome to isolate the computer code that caused the failure because a vast amount of system information must be read. Also, transmission of large files over a network consumes resources and time, reducing the convenience of remote failure prevention systems. Therefore, mechanisms have been developed to generate a minidump, which is an abbreviated record of a crash dump. A detailed description of a method for creating a minidump from a crash dump is found in commonly assigned U.S. Pat. No. 6,681,348, titled CREATION OF MINI DUMP FILES FROM FULL DUMP FILES, issued Jan. 20, 2004, the content of which is expressly incorporated herein by reference.

At block 306, the failure identification method 300 identifies the stack pointer from the minidump obtained at block 304. As described previously, the stack pointer references the last data item placed on the stack that is associated with the active thread. As known to those skilled in the art and others, each memory location on a stack is allocated a predetermined number of bytes to store a data item. Also, the memory allocated to the stack is sequential so that each memory location is located the pre-determined number of bytes away from an adjacent memory location. Thus, when the stack pointer is identified, the method 300 is able to identify each data item on the stack by successively accessing memory locations that are the predetermined number of bytes away from the stack pointer.

At block 308, the failure identification method 300 selects a memory location on the stack. The first memory location selected is the memory location referenced by the stack pointer. Each successive memory location selected is obtained by moving the predetermined number of bytes away from the previous memory location selected. For each selected memory location, the failure identification method 300 determines if the data item stored in the selected memory location is a valid base pointer. Also, the method 300 determines if the adjacent memory location stores a valid return address. From the base pointer and return address the method 300 is able to identify candidate DLLs that may be the source of the failure.

At decision block 310, the method determines if the selected memory location is a valid base pointer. As described previously and illustrated in FIG. 2, data items on the stack may be return addresses, function arguments, function parameters, or base pointers. Several tests are conducted on the selected memory location to determine if it is a valid base pointer. For example, a memory location that (1) does not point to a higher memory address, (2) points to itself, or (3) does not point to another memory address within the range allocated to the stack is not a valid base pointer. If the selected memory location is not a valid base pointer, the failure identification method 300 proceeds to block 316 discussed below. Conversely, if the selected location is a valid base pointer, the failure identification method 300 proceeds to block 312.

At decision block 312, the failure identification method 300 determines if the selected memory location is adjacent to a memory location that stores a valid return address. Each stack frame has one memory location that stores a base pointer and an adjacent memory location that stores a return address. Typically, the return address is stored in an adjacent but higher memory location on the stack in relation to the base pointer and references a segment of code where program execution will continue after the called function completes execution. More specifically, a valid return address references a location where a DLL is loaded in memory. As known to those skilled in the art, the functionality of a program is implemented in code libraries, such as DLLs, that are loaded from a storage device (i.e., a hard drive) into memory. At block 312, the failure identification method 300 determines if a memory location on the stack stores a valid return address by identifying the address space occupied by DLLs loaded in memory from the minidump. If a memory location on the stack stores a memory address occupied by a DLL, the failure identification method 300 determines that the memory location is a valid return address and proceeds to block 314. Conversely, if the adjacent memory location does not store a valid return address, the failure identification method 300 proceeds to block 316 discussed below.

At block 314, the failure identification method 300 stores the address of the selected memory location. As described in further detail below, the stored address will be used to identify chains of base pointers. From the chains of base pointers, candidate DLLs that may be the source of the failure are identified.

At decision block 316, a test is conducted to determine whether additional memory locations on the stack will be selected. As known to those skilled in the art, the bounds of the address space occupied by the stack is contained in the minidump. The determination whether an additional memory location will be selected is made by comparing the address space occupied by the stack with the address of the next memory location to be selected. If the next memory location to be selected is not in the address space allocated the stack, then at least one memory location has not been selected and the failure identification method 300 proceeds back to block 308 and blocks 308 through 314 repeat until all of the memory locations allocated to the stack have been selected. Conversely, if the selected memory address is not in the address space allocated to the stack then all the memory locations have been selected and the failure identification method 300 proceeds to block 318 described below.

The exemplary flow diagram illustrated in FIG. 3 next selects a subset of base pointers in order to identify candidate DLLs that may be the source of the failure. More specifically, at block 318 the subset of base pointers is selected using one or a combination of techniques that is described below with reference to FIGS. 4-5.

At block 320, the failure identification module identifies candidate DLLs that may be the source of the failure. As described above, each base pointer in a stack is adjacent to an associated return address that references a memory location occupied by a DLL. The candidate DLLs are those DLLs that occupy memory locations referenced by return addresses that are associated with the selected base pointers.

At block 322, the failure identification method 300 determines which DLL from the candidate DLLs identified at block 320 is the most likely source of the failure. When a failure occurs, the abnormal behavior may cause data items stored in the stack or other data stored in memory to be deleted or overwritten. Also, certain compiler optimization techniques may prevent data items from being placed on the stack. For example, some compilers perform an optimization technique that releases base pointers from stack frames so that maintenance overhead is minimized. Thus, fast code may be generated. However, as a result, data items on the stack may not be accurately reflected in the information obtained from the mini-dump. Thus, in certain circumstances, the present invention is only able to identify the most likely source of the failure. At block 322, the failure identification method 300 analyzes each candidate DLL. In one exemplary embodiment, the failure identification method 300 compares the candidate DLLs to a database that contains DLLs known to cause failures for a match. If a candidate DLL is identified as a DLL known to cause failures, the method 300 determines that the candidate DLL is the source of the failure. In another exemplary embodiment, each candidate DLL is assigned a weight based on factors that are indicative of failure producing DLLs. For example, since plug-in modules are the source of a high percentage of known failures, one factor for assigning a weight is whether a candidate DLL is from a plug-in module. As known to those skilled in the art, other factors may be used to assign a weight to candidate DLLs.

At decision block 324, the method determines if the DLL identified as the source of the failure at block 322 is from a plug-in module. As described above with reference to FIG. 1, when a program, such as a plug-in module, is installed on a computing device, the configuration database 100 identifies the DLLs used by the program. Since developers each build DLLs designed to implement their programs, the set of DLLs used by a program is unique. To determine if a DLL is from a plug-in module, the failure identification method 300 searches the configuration database 110. If a program is associated with the failure causing DLL and is also identified as being a plug-in module, the failure identification method 300 determines that the failure was caused by a plug-in module.

If the failure was not caused by a plug-in module, the failure identification method 300 proceeds to block 328 described below. If the failure was caused by a plug-in module, the method proceeds to block 326. At block 326, an existing system obtains feedback from the user for the purpose of preventing future failures. For example, in an exemplary embodiment, a prompt informs the user that a plug-in module caused the failure. The message also prompts the user for instructions on handling the failure such as whether the plug-in module should be disabled. Alternatively, the plug-in module may be disabled automatically without any affirmative user input. In another exemplary embodiment, the user is provided with information regarding whether an update may be obtained for the failure producing plug-in module. A more detailed description of a method for preventing failures caused by plug-in modules in the context of a Web browser that may be used in conjunction with the present invention is found in commonly assigned U.S. Pat. No. 10/814, 591 titled SYSTEM AND METHOD OF PREVENTING A WEB BROWSER PLUG-IN MODULE FROM GENERATING A FAILURE, filed Mar. 31, 2004, the content of which is expressly incorporated herein by reference.

At block 328, an existing failure collection system is notified of the failure and the minidump obtained at block 304 is collected in a repository on a remote computing device. A detailed description of an existing failure collection system suitable to store a minidump may be found in commonly assigned U.S. Pat. No. 6,629,267, titled METHOD AND SYSTEM FOR REPORTING A PROGRAM FAILURE, issued Sep. 30, 2003, the content of which is expressly incorporated herein by reference. Continued collection of failure data assists developers in updating systems designed to identify and prevent failures. Then the failure identification method 300 proceeds to block 330 where it terminates.

The steps in the failure identification method 300 may be implemented in a different order and with variations that do not depart from the scope of the present invention. For example, at block 324, the failure identification method 300 determines if the DLL identified as the most likely source of the failure is from a plug-in module. However, in embodiments where a weight is assigned to candidate DLLs and the weight is based on whether a candidate DLL is from a plug-in module, a determination is made whether each candidate DLL is from a plug-in module. In this example, steps are performed in a different order than described above.

An aspect of the present invention selects a subset of base pointers from a stack in order to identify candidate DLLs that may be the source of the failure. More specifically, the failure prevention method 300 (at block 318) selects a subset of base pointers using one or more selection techniques designed to eliminate base pointers that could not be the source of the failure. As described above, a failure may cause one or more memory locations in the stack to be deleted or overwritten. Also, the stack may be altered because of compiler optimization. Thus, in some circumstances, links between base pointers may not be accurately represented in the minidump. As a result, the present invention may use different selection techniques, alone or in combination, to select a subset of base pointers.

Figure 4A:
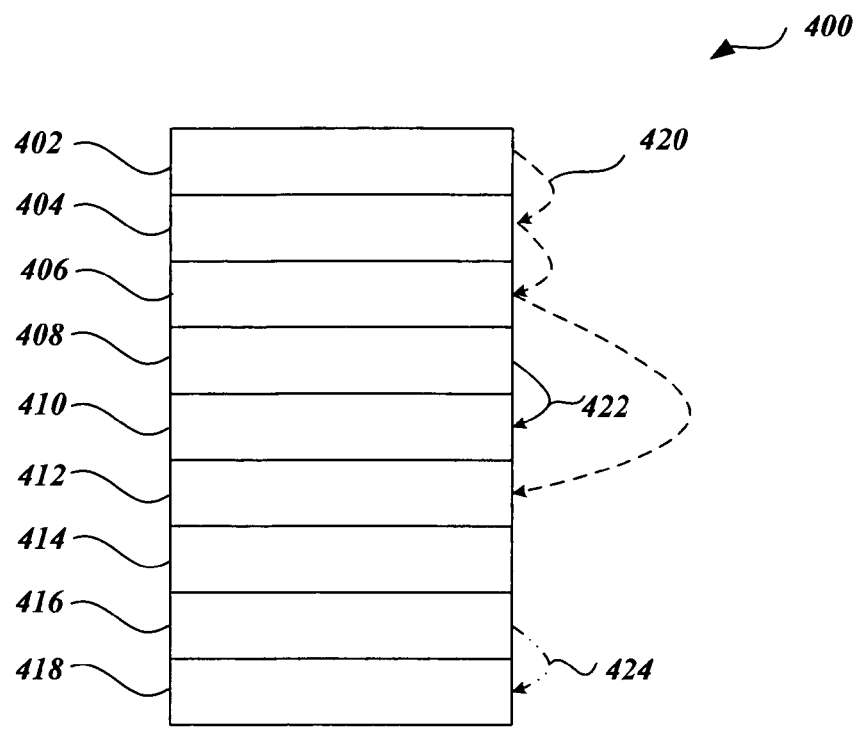
FIG. 4A is a pictorial depiction of a stack data structure that illustrates how chains of base pointers link memory locations.

FIG. 4A illustrates an exemplary input stack 400 with nine memory locations 402, 404, 406, 408, 410, 412, 414, 416, and 418. The arrows between memory locations indicate that the memory locations store linked base pointers. For ease of illustration and because it is not important to an understanding of the present invention, the input stack 400 is not an accurate representation of how data items may appear on an actual stack obtained from the minidump. For example, input stack 400 only contains one memory location that is not a base pointer, namely memory location 414. As described above with reference to FIG. 2, an actual stack will contain a higher percentage of data items that are not base pointers than input stack 400.

Each base pointer on the input stack 400 refers to a memory location which records the previous base pointer value, and so on in a continuous chain. Thus, a downward-directed linked list may be formed by a chain of memory locations that store base pointers. A stack may, and often will, contain independent chains of base pointers that are not linked. For example, FIG. 4A contains three separate chains of base pointers; namely chain 420 composed of memory locations 402, 404, 406, and 412, chain 422 composed of memory locations 408 and 410, and chain 424 composed of memory locations 416 and 418.

Figure 4B:
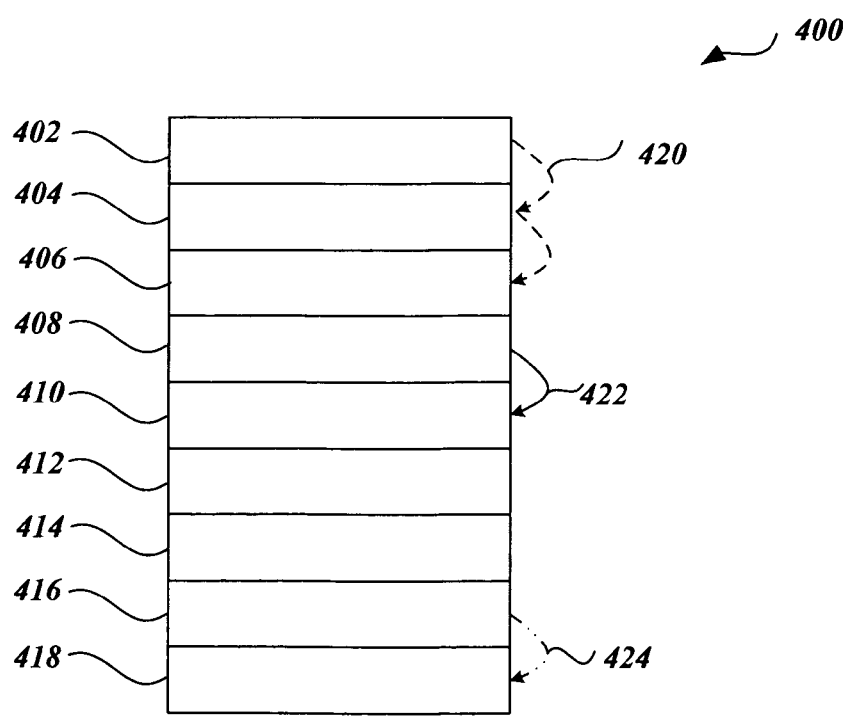
FIG. 4B is a pictorial depiction of the stack data structure illustrated in FIG. 4A with a subset of base pointers selected in accordance with one embodiment of the present invention.

FIG. 4B depicts the input stack 400 illustrated in FIG. 4A after a subset of base pointers is selected from the input stack 400 with one embodiment of the present invention. Each chain of base pointers is analyzed and compared to other chains on the input stack 400. In this embodiment (illustrated in FIG. 4B), a determination is made regarding whether one or more chains of base pointers in the input stack 400 overlap (which occurs when one chain contains at least one memory location at both a higher address than the highest address of a second chain and a lower address than the lowest address of the second chain). As illustrated in FIG. 4A, chain 420 overlaps with chain 422. In this embodiment, the subset of base pointers selected are those in the input stack 400, except those base pointers that may be removed to prevent the overlap from occurring. In this instance, all of base pointers in chain 422 and chain 424 are selected and the base pointers in chain 420 are selected except the base pointer in memory location 412, which causes the overlap.

Figure 4C:
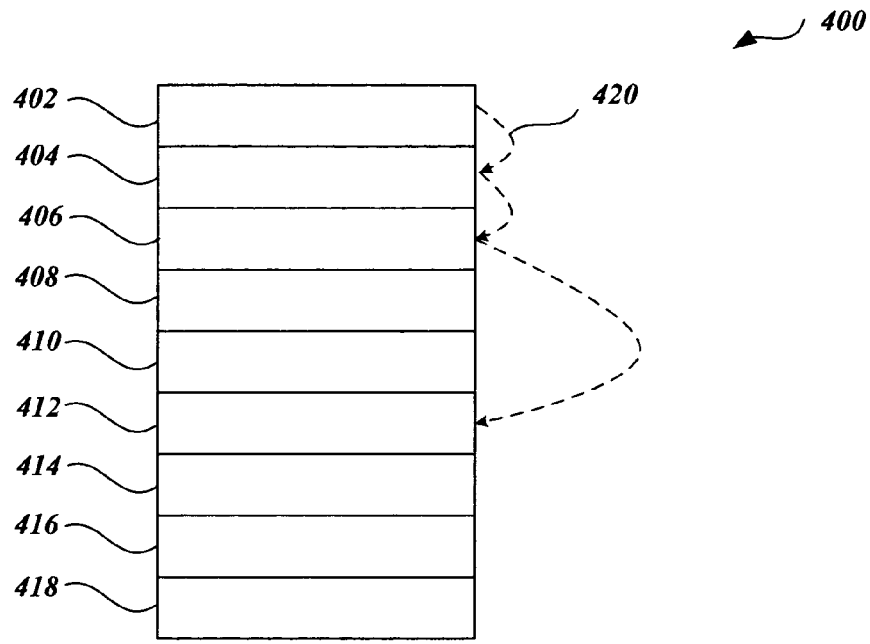
FIG. 4C is a pictorial depiction of the stack data structure illustrated in FIG. 4A with a subset of base pointers selected in accordance with another embodiment of the present invention.

FIG. 4C depicts the input stack 400 illustrated in FIG. 4A after a subset of base pointers is selected with another embodiment of the present invention. Each chain of base pointers is analyzed and compared to other chains on the input stack 400 to determine which chain is the longest (i.e., contains the most memory locations). As illustrated in FIG. 4C, chain 422 consists of four memory locations, which is the most of the chains identified. Thus, in this embodiment, the subsets of base pointers selected are those in chain 420, namely those base pointers stored in memory locations 402, 404, 406, and 412.

Figure 4D:
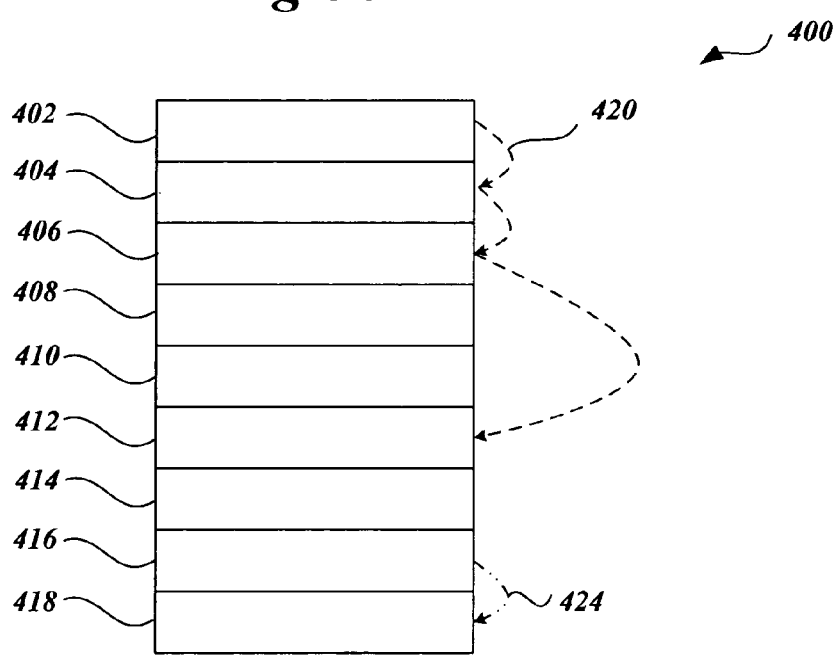
FIG. 4D is a pictorial depiction of the stack data structure illustrated in FIG. 4A with a subset of base pointers selected in accordance with a further embodiment of the present invention.

FIG. 4D depicts the input stack 400 illustrated in FIG. 4A after a subset of base pointers is selected with yet another embodiment of the present invention. Each chain of base pointers is compared to other chains on the input stack 400 to determine if one or more chains overlap. As illustrated in FIG. 4A, chain 420 overlaps with chain 422. In this embodiment, chains of base pointers that overlap are assigned a weight that depends on which chain is the longest (i.e., contains the most memory locations). Base pointers that are in overlapping chains with a lower weight than their overlapping counterpart are not included in the subset of base pointers selected. However, the subset of base pointers selected includes base pointers in chains that do not overlap and those in chains that overlap and have a higher weight than their overlapping counterpart. In the example illustrated in FIG. 4D, chains 420 and 422 overlap. Since chain 420 consists of more memory locations than chain 422, base pointers in chain 420 are included in the subset of base pointers selected.

Figure 5A:
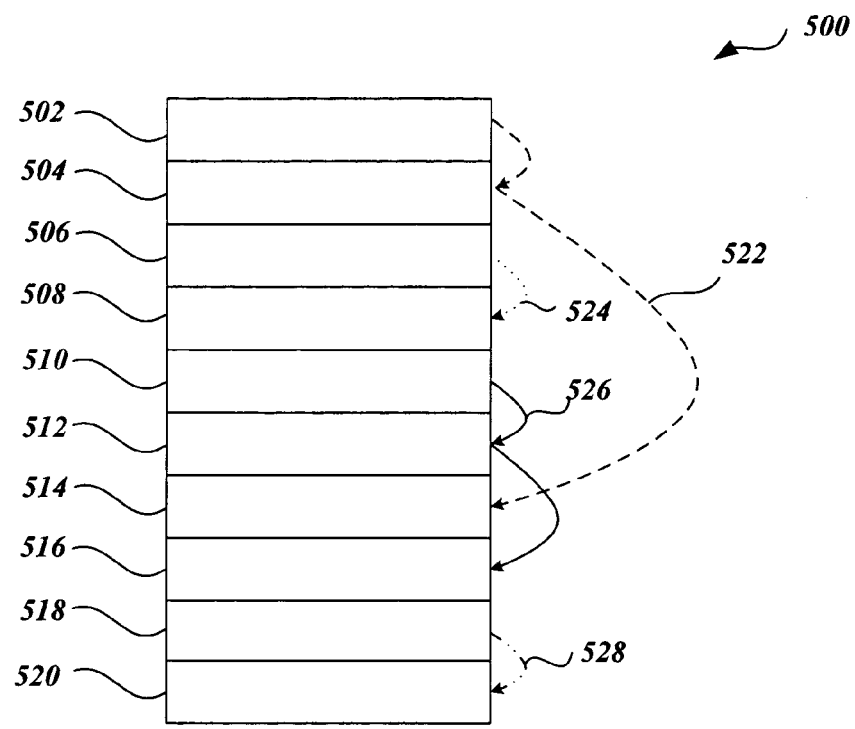
FIG. 5A is a pictorial depiction of a stack data structure suitable to illustrate how chains of base pointers link memory locations.

FIG. 5A illustrates an exemplary input stack 500 with ten memory locations 502, 504, 506, 508, 510, 512, 514, 516, 518 and 520. Similar to FIG. 4A, the arrows between memory locations indicate that the memory locations store base pointers that are linked. As illustrated, FIG. 5A contains four separate chains of base pointers; namely chain 522 composed of memory locations 502, 504, and 514, chain 524 composed of memory locations 506 and 508, chain 526 composed of memory locations 510, 512 and 516, and chain 528 composed of memory locations 518 and 520.

Figure 5B:
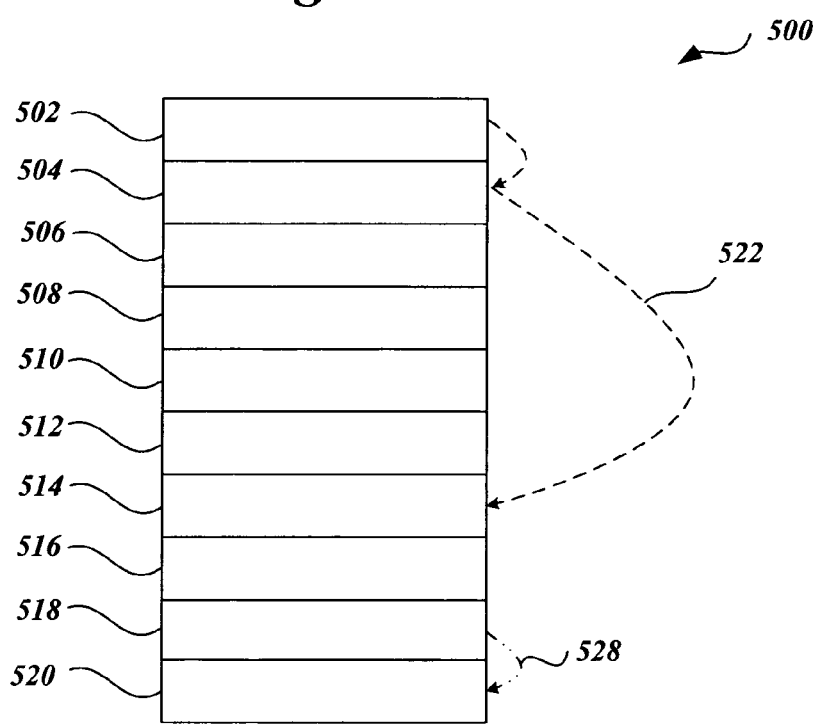
FIG. 5B is a pictorial depiction of the stack data structure illustrated in FIG. 5A with a subset of base pointers selected in accordance with one embodiment of the present invention.

FIG. 5B depicts the input stack 500 illustrated in FIG. 5A after a subset of base pointers is selected by yet another embodiment of the present invention. Each chain of base pointers is compared to other chains on the input stack 500 to determine if one or more chains overlap. Also, a determination is made whether one chain "partially overlaps" with a second chain. As described above, chains of base pointers overlap when one chain contains at least one memory location at both a higher address than a second chain's highest memory address and a memory location at a lower address than the second chain's lowest memory address. Chains partially overlap when one chain contains a memory location at both a higher memory address than a second chain highest address and a lower address than the second chain's highest memory address. In the example depicted in FIG. 5B, chain 522 overlaps chain 524 and partially overlaps chain 526. Chains of base pointers that overlap or partially overlap are assigned a weight based on the range of memory locations that the chain spans. For example, chain 522, which is composed of memory locations 502, 504, and 514, is assigned a weight of seven (7) because it spans seven memory locations. In this embodiment, base pointers that are in overlapping or partially overlapping chains with a lower weight than their overlapping counterpart are not included in the subset of base pointers selected. Conversely, the subset of base pointers selected includes base pointers in chains that do not overlap and base pointers in chains that overlap but are assigned a higher weight than their overlapping counterparts. In the example illustrated in FIG. 5B, chains 522 and 524 overlap. Since chain 522 spans more memory locations than chain 524, chain 522 is included in the subset of base pointers selected and chain 522 is not. Also, chains 522 and 526 partially overlap. Since chain 522 spans more memory locations than chain 526, chain 522 is included in the subset of base pointers selected and chain 526 is not.

The present invention includes other alternative embodiments for selecting a subset of base pointers and identifying candidate DLLs. In one alternative embodiment, the subset of base pointers selected are those in a predetermined range of memory on the stack. In yet another alternative embodiment, the subset of base pointers is selected by identifying the chain in the input stack that spans the widest range of memory locations and selecting all base pointers in that chain.

Now with reference to FIG. 6, the benefits of utilizing a network to transmit information between the computing device 100 and a server is described. The software-implemented routines employed by embodiments of the present invention may be stored solely on a computing device, such as computing device 100. As a result, the present invention is functional in stand-alone systems not connected to a network. However, the software-implemented routines employed by embodiments of the present invention may be stored on a remote computing device, such as server computing device 500, or any other computing device operative to transmit content to network 502.

A remote computing device, such as server computing device 500, may be used for several purposes. The failure collection system described above with reference to FIG. 3 at block 328 may transmit data to a database, such as the failure collection database 504 that assists developers in keeping failure prevention systems updated. For example, the server computing device 500 may be used to update the failure identification module 108 so that current information regarding updates to plug-in modules may be disseminated to users. Also, the server computing device 500 may be used to update the software-implemented routines of the present invention to better identify candidate DLLs. For example, as described above, the present invention may implement one of many techniques for selecting a subset of base pointers. If one base pointer selection technique proves to be more accurate in identifying candidate DLLs, the present invention may be adjusted to implement the more effective selection technique.

While the presently preferred embodiment of the invention has been illustrated and described, it will be readily appreciated by those skilled in the art and others that, within the scope of the appended claims, various changes can be made therein without departing from the spirit and scope of the invention.

The embodiments of the invention in which an exclusive property or privilege is claimed are defined as follows:

1. In a computing device that includes an operating system and at least one program, a method of identifying the source of a failure, comprising:
   (a) in response to receiving notice of a failure, obtaining the memory contents of said computing device, the memory contents including the stack associated with the active thread;
   (b) identifying base pointers stored in the stack by:
      (i) determining if a memory location references a higher memory address; and
      (ii) if a memory location does not reference a higher memory address determining that the memory location does not store a base pointer;
   (c) selecting a subset of base pointers stored in the stack; and
   (d) identifying a code library from the subset of base pointers that caused a failure generating instruction to be executed.

2. The method as recited in claim 1, further comprising identifying a program that implements the code library that caused a failure generating instruction to be executed wherein identifying the program includes searching a configuration database for associations between programs and code libraries.

3. The method as recited in claim 1, further comprising determining if the code library identified as the source of the failure is from a plug-in module.

4. The method as recited in claim 3, further comprising if the source of the failure is from a plug-in module disabling the plug-in module.

5. The method as recited in claim 1, wherein selected memory contents of said computing device are stored in a minidump file.

6. The method as recited in claim 1, wherein identifying the base pointers stored in the stack includes obtaining the value of the stack pointer from a minidump file.

7. The method as recited in claim 1, wherein selecting a subset of base pointers stored in the stack includes identifying chains of base pointers that are linked.

8. The method as recited in claim 7, wherein the selected subset of base pointers includes the base pointers stored in the stack except base pointers that cause chains to overlap.

9. The method as recited in claim 7, wherein the selected subset of base pointers are the base pointers in a chain that contains the most memory locations compared to other chains.

10. The method as recited in claim 7, wherein the selected subset of base pointers are the base pointers stored in the stack except base pointers in a first chain that overlaps a second chain and consists of fewer memory locations than the second chain.

11. The method as recited in claim 7, wherein the selected subset of base pointers are the base pointers stored in the stack except base pointers in a first chain that overlaps a second chain and spans a smaller range of memory locations than the second chain.

12. The method as recited in claim 7, wherein the selected subset of base pointers are the base pointers stored in the stack except base pointers in a first chain that overlaps or partially overlaps a second chain and spans a smaller range of memory locations than the second chain.

13. The method as recited in claim 7, wherein the selected subset of base pointers are the base pointers in the chain that spans the largest range of memory locations compared to other chains stored in the stack.

14. The method as recited in claim 7, wherein the selected subset of base pointers are the base pointers stored in the stack in a predetermined range of memory addresses.

15. The method as recited in claim 1, wherein identifying a code library from the subset of base pointers that caused a failure-generating instruction to be executed includes searching a database that stores code libraries known to cause failures.

16. A computer-readable medium bearing computer-executable instructions which, when executed, carry out a method for identifying the source of a failure, comprising:
   (a) in response to receiving notice of a failure, obtaining the memory contents of said computing device wherein the memory contents includes the stack associated with the active thread;
   (b) identifying base pointers stored in the stack by:
      (i) determining if a memory location references a higher memory address; and
      (ii) if a memory location does not reference a higher memory address, determining that the memory location does not store a base pointer;
   (c) selecting a subset of base pointers stored in the stack; and
   (d) identifying a code library from the subset of base pointers that caused a failure generating instruction to be executed.

17. The computer-readable medium as recited in claim 16, further comprising identifying a program that implements the code library that caused a failure generating instruction to be executed wherein identifying the program includes searching a configuration database for associations between programs and code libraries.

18. The computer-readable medium as recited in claim 16, further comprising determining if the code library identified as the source of the failure is from a plug-in module.

19. The computer-readable medium as recited in claim 18, further comprising if the source of the failure is from a plug-in module identifying and disabling the plug-in module.

20. The computer-readable medium as recited in claim 16, wherein selected memory contents of said computing device are stored in a minidump file.

21. The computer-readable medium as recited in claim 16, wherein identifying the base pointers stored in the stack includes obtaining the value of the stack pointer from a minidump file.

22. The computer-readable medium as recited in claim 18, wherein identifying a subset of base pointers in the stack includes identifying chains of base pointers that are linked.

23. The computer-readable medium as recited in claim 22, wherein the subset of base pointers selected includes the base pointers stored in the stack, except base pointers that cause chains to overlap.

24. The computer-readable medium as recited in claim 22, wherein the subset of base pointers selected are the base pointers in a chain that contain the most memory locations compared to other chains.

25. The computer-readable medium as recited in claim 22, wherein the subset of base pointers selected are the base pointers stored in the stack, except base pointers in a first chain that overlaps a second chain and consists of fewer memory locations than the second chain.

26. The computer-readable medium as recited in claim 22, wherein the subset of base pointers selected are the base pointers stored in the stack, except base pointers in a first chain that overlaps a second chain and spans a smaller range of memory locations than the second chain.

27. The computer-readable medium as recited in claim 22, wherein the subset of base pointers selected are the base pointers stored in the stack, except base pointers in a first chain that overlaps or partially overlaps a second chain and spans a smaller range of memory locations than the second chain.

28. The computer-readable medium as recited in claim 22, wherein the subset of base pointers selected are the base pointers in the chain that spans the largest range of memory locations compared to other chains stored in the stack.

29. The computer-readable medium as recited in claim 22, wherein the subset of base pointers selected are the base pointers stored in the stack in a predetermined range of memory addresses.

30. The computer-readable medium as recited in claim 16, wherein identifying a code library that was the source of the failure includes searching a database that stores code libraries known to cause failures.

31. In a computing device that includes an operating system and at least one program, a method of identifying the source of a failure, comprising:
   (a) in response to receiving notice of a failure, obtaining the memory contents of said computing device, the memory contents including the stack associated with the active thread;
   (b) identifying base pointers stored in the stack by:
      (i) determining if a memory location references a memory address allocated to the stack; and
      (ii) if a memory location does not reference a memory address allocated to the stack determining that the memory location does not store a base pointer;
   (c) selecting a subset of base pointers stored in the stack; and
   (d) identifying a code library from the subset of base pointers that caused a failure generating instruction to be executed.

32. A computer-readable medium bearing computer-executable instructions which, when executed, carry out a method for identifying the source of a failure, comprising:
   (a) in response to receiving notice of a failure, obtaining the memory contents of said computing device wherein the memory contents includes the stack associated with the active thread;
   (b) identifying base pointers stored in the stack by:
      (i) determining if a memory location references a memory address allocated to the stack; and
      (ii) if a memory location does not reference a memory address allocated to the stack, determining that the memory location does not store a base pointer;
   (c) selecting a subset of base pointers stored in the stack; and
   (d) identifying a code library from the subset of base pointers that caused a failure generating instruction to be executed.

* * * * *

UNITED STATES PATENT AND TRADEMARK OFFICE
CERTIFICATE OF CORRECTION

| | |
|---|---|
| PATENT NO. | : 7,321,988 B2 |
| APPLICATION NO. | : 10/880819 |
| DATED | : January 22, 2008 |
| INVENTOR(S) | : Quji Guo et al. |

It is certified that error appears in the above-identified patent and that said Letters Patent is hereby corrected as shown below:

In column 15, line 1, in Claim 22, delete "claim 18," and insert -- claim 16, --, therefor.

Signed and Sealed this
Twenty-second Day of February, 2011

David J. Kappos
*Director of the United States Patent and Trademark Office*